April 28, 1931.   E. F. HINNENKAMP   1,803,113

VALVE

Filed Feb. 4, 1929   2 Sheets-Sheet 1

Inventor

Elmer F. Hinnenkamp,

By J. Stanley Brich

Attorney

April 28, 1931. E. F. HINNENKAMP 1,803,113
VALVE
Filed Feb. 4, 1929 2 Sheets-Sheet 2

Inventor
Elmer F. Hinnenkamp
By J. Stanley Burch
Attorney

Patented Apr. 28, 1931

1,803,113

UNITED STATES PATENT OFFICE

ELMER F. HINNENKAMP, OF CINCINNATI, OHIO, ASSIGNOR, BY MESNE ASSIGNMENTS, TO THE OHIO PATTERN WORKS AND FOUNDRY COMPANY, OF CINCINNATI, OHIO, A CORPORATION OF OHIO

VALVE

Application filed February 4, 1929. Serial No. 337,398.

This invention relates to an improved valve of the packless variety used in steam, hot water and vapor circulating systems, but equally useful as a water faucet and in other relations where it is desired to control the fluid whether in liquid or gaseous form.

One feature of the invention is predicated upon the fact that the valve opens or closes with but one turn or a single rotation of the handle, the arrangement being such that in spite of this slight turn of the handle, there is nevertheless a relatively great degree of movement of the valve toward and from its seat.

It is also a feature to provide a valve with a casing of the angle type having its intake off-set with respect to the valve seat, thereby permitting the provision of a valve casing of standard size having a relatively large valve seat opening.

It is a further object to provide a valve of this type which is characterized by a novel internal carrier having both rotary and reciprocatory motion and designed to permit the valve per se to be swivelly mounted thereon, whereby to insure an effective closing of the valve against its seat to compensate for unequal expansion and contraction.

One of the chief structural features of merit is an especially designed non-binding bonnet assembly made up of separable parts to facilitate repair and adjustment, and distinguished by a novel packing box and gland and associated valve operating shaft.

Other features and advantages will become more readily apparent from the following description and drawing.

Figure 1:
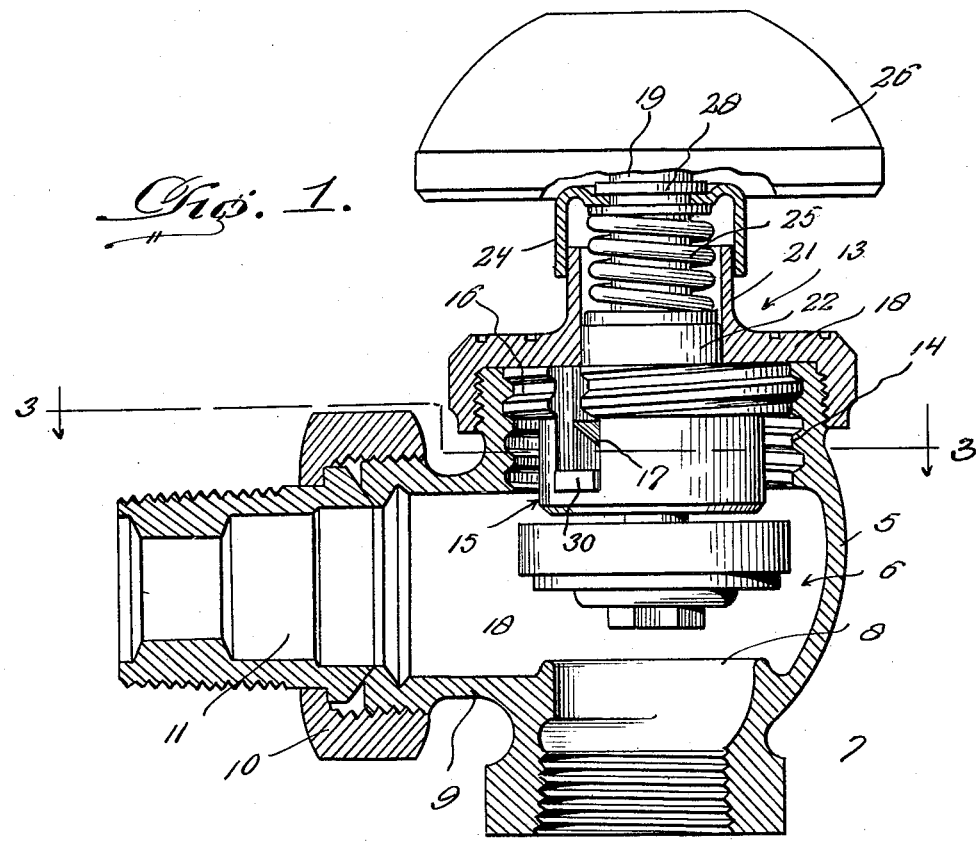
Figure 1 is a view in section and elevation of a complete packless valve constructed in accordance with the present invention.
Figure 3:
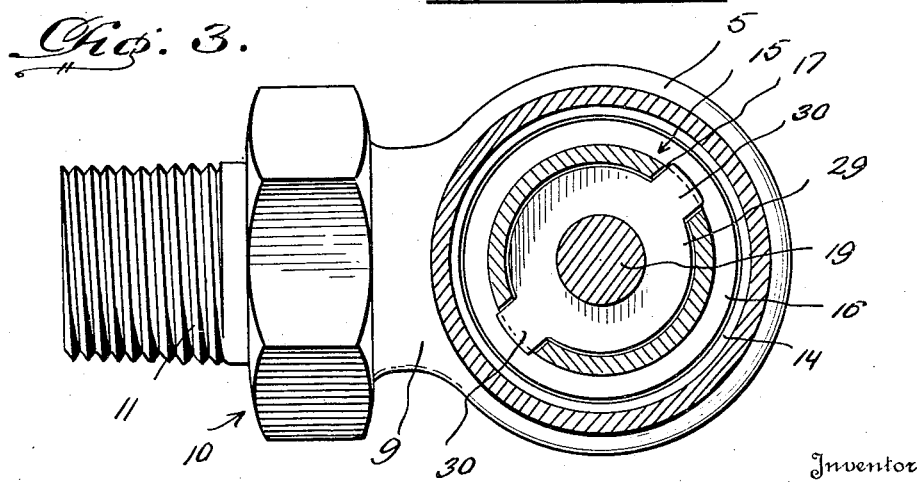
Figure 3 is a horizontal sectional view taken approximately upon the plane of the line 3—3 of Figure 1.
Figure 2:
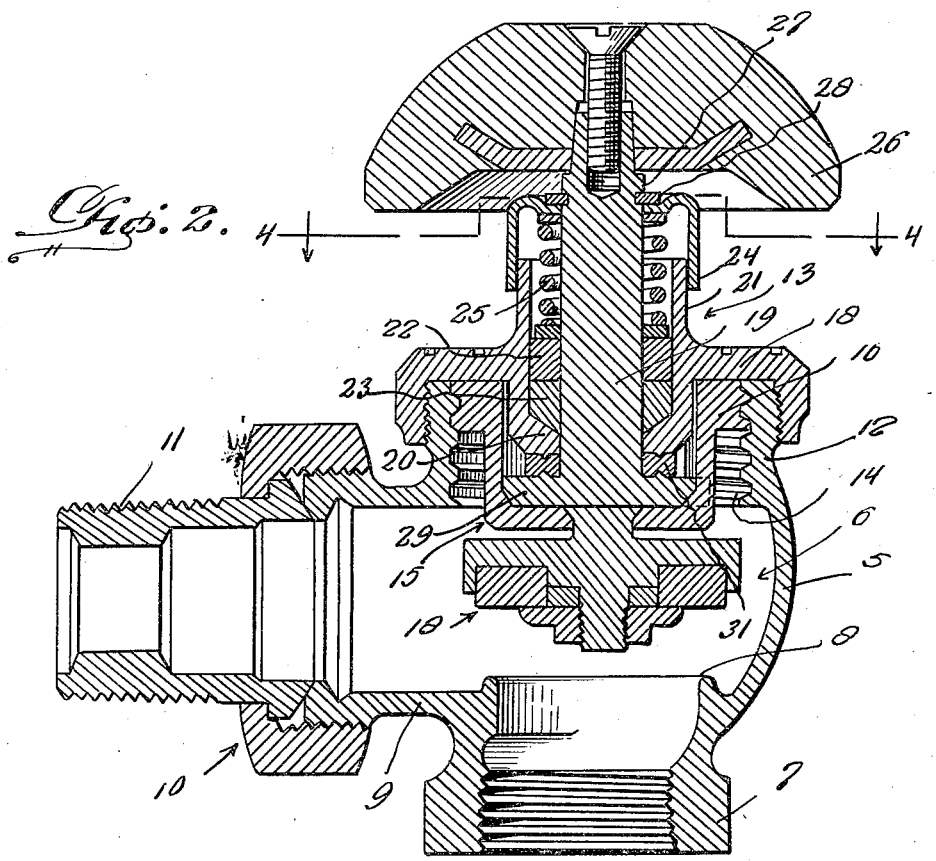
Figure 2 is a central vertical sectional view of the same showing the exacting relationship of parts.
Figure 4:
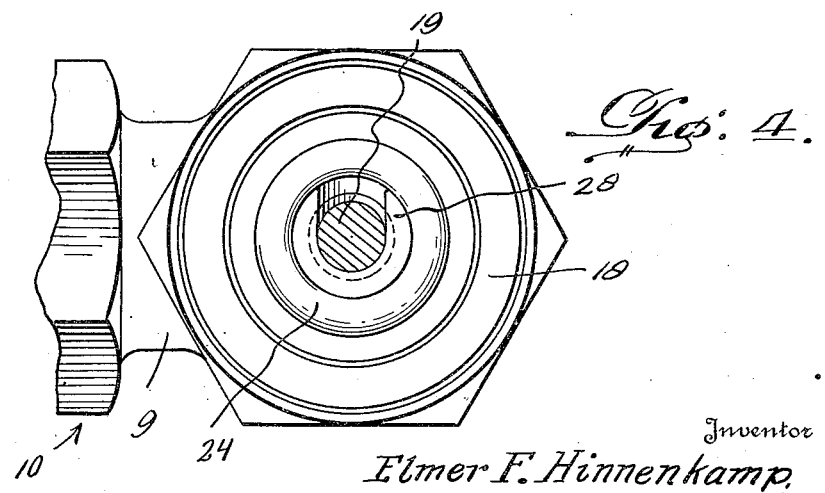
Figure 4 is a similar horizontal sectional view taken on the plane of the line 4—4 of Figure 2.

Referring now to the drawings by reference numerals it will be observed that 5 designates the globe-like casing constructed to provide a comparatively large size waterway and internal valve chamber 6. The reference character 7 designates a pipe connection having an off-set valve seat 8 associated therewith. Extending at right angles to this is a pipe connection 9, and a union or coupling 10 carrying an associated coupling nipple 11. Also formed integrally with this casing is an especially designed neck 12 having small external screw threads to couple it with or to accommodate the bonnet assembly 13 and having relatively large screw threads 14 to accommodate a valve carrier 15. This valve carrier is in the form of a cup having a rim at its top provided with screw threads as at 16 meshing with the threads 14. As shown in Figure 1 this carrier is formed on diametrically opposite sides with notches or slots 17 functioning as keyways. This carrier is intended to be rotated and to be moved toward and from the valve seat. The valve 18, which may be of any appropriate construction, is swivelly mounted on the carrier as plainly shown in Figure 2 and movable toward and from the seat.

The bonnet assembly comprises a cap 18 whose screw-threaded rim portion is threaded on the external threads of the casing neck 12. This cap is provided at its center with a stuffing box and packing gland for the operating shaft 19. This stuffing box structure includes a depending annulus 20 telescoping down into the cup-like carrier 15 and an upstanding annulus 21 functioning as a collar. Superposed packing rings 22 and 23 are seated in the lower annulus 20. A dust cap 24 fits telescopically over the upper collar-forming annulus and a coil spring 25 is fitted within the dust cap and collar, bearing at its opposite ends on fiber rings as shown.

This packing box and packing gland structure provides an effective fluid-tight mounting and joint around the operating shaft 19. This shaft is provided with an operating handle or knob 26 on its top and just below the handle is an outstanding collar 27 and a groove accommodating a horse-shoe retainer 28. Incidentally, it will be noted that the central portion of the dust cap 24 is provided with a depression to accommodate the retainer. This serves to maintain the dust cap in assembled position and retains the spring 25 under compression. On the lower end of the shaft is a disk 29 having diametrically opposite lugs 30 functioning as keys and extending into the key-ways 17. This provides an operating connection between the shaft and the valve carrier. With this arrangement it is obvious that when the knob 26 is grasped and rotated, this will turn the operating shaft 19 as well as the disk 29 on the lower end thereof. The slidable key connection between this disk and the carrier will turn the carrier. Hence, when the shaft is turned in one direction, the carrier and the valve will move toward the valve seat, and when turned in the opposite direction it will move away from the valve seat. The threads on the carrier and casing are such that a single revolution of the knob will serve to seat the valve, if the valve is open, or will serve to move the valve to the open position shown in Figure 2 when turned in the opposite direction. Thus a rapid closing and opening of the valve is effected by a single turn of the knob.

In connection with a centralized packing gland it will be observed that the expansion of the coiled spring exerts an upward thrust on the dust collar 24 and a downward compression on the packing rings 22 and 23. Also it exerts an upward lift on the operating shaft 19 and serves to bind this shaft tightly against a fiber packing ring 31 which is interposed between the disk and the bottom of the packing box annulus 20. It may be mentioned that the annulus as well as the disk is formed with a circumferential rib, the ribs fitting into circumferentially extending grooves in the packing ring to effect a tight joint connection.

The following are some of the features of merit. The valve includes a positive grip, composition knob or handle of heat-resisting material, a non-binding bonnet assembly, a special tempered spring which is cadmium plated and non-corrosive. In addition, there is a special molded permanent packing ring and brass washer arrangement, as well as a heavy disk carrier with wide diameter threads. Then too, there is a disk with a two-lug or two-rib contact with two slots in the disk carrier and a stem or shaft and driving disk cast in one piece which is positively non-rising. Further I call attention to the swivel disk holder, the exceptional high lift, the comparatively large size waterway, and other features already mentioned.

A careful consideration of the description in connection with the drawings will enable the reader to obtain a clear understanding of the same. Therefore a more lengthy description is regarded unnecessary.

Minor changes in shape, size and rearrangement of details coming within the field of invention claimed, may be resorted to in actual practice if desired.

I claim:

1. In a valve of the class described, a casing having intake and discharge pipe connections, an internal valve chamber, a valve seat in said chamber, and a bonnet coupling neck opposite the valve seat, said neck being internally screw threaded, a valve carrier in said chamber threadedly connected with the internal screw threads of said neck, a valve mounted on said carrier and movable toward and from said seat, a bonnet assembly attached to said neck and including a rotary operating shaft having operating connection with said carrier, said carrier being of cupped form and provided with diametrically opposite key-ways, and said shaft having a disk fitting in said carrier and said disk having outstanding keys fitting in said key-ways.

2. In a valve structure of the class described, a casing having an internal valve seat, a valve chamber, and a neck, said neck being internally and externally screw threaded, a substantially cup-shaped carrier having a threaded rim portion connected with the internal threads of said neck, a valve swivelly mounted on said carrier and movable toward and from said seat, a bonnet assembly including a cap having a screw threaded rim attached to the external threads of said neck and a central packing box and gland, a shaft extending through said packing box and gland, having an operating knob on its outer end, and a disk on its inner end fitting into said cup carrier, said carrier having vertical diametrically opposite key-ways and said disk having diametrically opposite keys extending into said key-ways.

In testimony whereof I affix my signature.

ELMER F. HINNENKAMP.